(12) United States Patent
Bartsch et al.

(10) Patent No.: US 6,869,028 B2
(45) Date of Patent: Mar. 22, 2005

(54) SPRAYING DEVICE

(75) Inventors: Eric Richard Bartsch, Cincinati, OH (US); Henry Cheng Na, Cincinnati, OH (US); John Allen Wooton, New Richmond, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/875,686

(22) Filed: Jun. 6, 2001

(65) Prior Publication Data

US 2002/0046969 A1 Apr. 25, 2002

(51) Int. Cl.[7] .............................. B05B 7/26; B05B 7/02; B05B 1/14; A62C 3/62
(52) U.S. Cl. ..................... 239/315; 239/553.3; 239/525; 239/303
(58) Field of Search ................................. 239/315, 302, 239/375, 525, 553, 553.3, 548, 550, 551, 553.5, 562, 581.1, 462, 303; 210/266, 651, 285, 286, 473, 477, 321.75, 282

(56) References Cited

U.S. PATENT DOCUMENTS

| | | | |
|---|---|---|---|
| 1,872,058 A | 8/1932 | Bramsen et al. | |
| 2,078,543 A | 4/1937 | Salisbury | |
| D110,841 S | 8/1938 | Tobler | |

(List continued on next page.)

FOREIGN PATENT DOCUMENTS

| CA | 2 047 085 | 1/1992 | |
|---|---|---|---|
| DE | A-2161591 | 6/1973 | |
| DE | 38 14726 A1 | 9/1989 | |
| EP | 0 467 472 A2 | 1/1992 | |
| EP | 0 368 101 | 1/1994 | |
| EP | 0 808 662 A2 | 11/1997 | |
| EP | 0 859 045 A1 | 8/1998 | |
| EP | 0 859 046 A1 | 8/1998 | |
| EP | 0 919 610 A1 | 6/1999 | |
| EP | 1 158 033 A1 | 11/2001 | |
| GB | 1376379 | 12/1974 | |
| GB | 2 303373 A | 2/1997 | |
| JP | 3-127684 | 5/1991 | |
| JP | 03127684 A | * 5/1991 | ........... B01D/63/08 |
| JP | 03-169540 | 7/1991 | |
| JP | 04-353438 | 12/1992 | |
| JP | 07-268674 | 10/1995 | |
| JP | 08-053558 A | 2/1996 | |
| JP | 08266956 | 10/1996 | |
| WO | WO 95/00611 A1 | 1/1995 | |
| WO | WO 97/03180 A1 | 1/1997 | |
| WO | WO 97/33963 A1 | 9/1997 | |
| WO | WO 97/43373 A1 | 11/1997 | |
| WO | WO 97/48927 A1 | 12/1997 | |
| WO | WO 98/01223 A1 | 1/1998 | |
| WO | WO 98/36046 A1 | 8/1998 | |
| WO | WO 99/00457 A1 | 1/1999 | |
| WO | WO99/20724 | 4/1999 | |
| WO | WO99/23194 | 5/1999 | |
| WO | WO 00/00554 A1 | 1/2000 | |
| WO | WO 00/77138 A1 | 12/2000 | |
| WO | WO 00/77143 A1 | 12/2000 | |
| WO | WO 00/77144 A1 | 12/2000 | |
| WO | WO 01/05920 A1 | 1/2001 | |
| WO | WO 01/27236 A1 | 4/2001 | |
| WO | WO 01/32820 A1 | 5/2001 | |
| WO | WO 01/96036 A1 | 12/2001 | |
| WO | WO 01/96511 | 12/2001 | |
| WO | WO 01/96512 | 12/2001 | |
| WO | WO 196516 | 12/2001 | |

*Primary Examiner*—Davis Hwu
(74) *Attorney, Agent, or Firm*—Jeffrey V. Bamber

(57) ABSTRACT

The present invention relates to a spraying device suitable for spraying cleaning compositions and rinse water onto hard surfaces. More particularly the spraying device may be attached to a hose, for example a conventional garden hose, so that the cleaning composition and rinse water can be applied to outside surfaces, such as vehicles or the outside surface of windows. The spraying device comprises a purifier located inside the cavity of a container and a spray head.

9 Claims, 5 Drawing Sheets

U.S. PATENT DOCUMENTS

| | | | |
|---|---|---|---|
| 2,772,120 A | 11/1956 | Olson | |
| 2,801,941 A | 8/1957 | Johnson | |
| 3,339,841 A | 9/1967 | Beach, Jr. | |
| 3,355,018 A | 11/1967 | Smith | |
| 3,382,177 A | 5/1968 | Woodruff | |
| 3,459,334 A | 8/1969 | Evans | |
| 3,464,631 A | 9/1969 | Liefring et al. | |
| 3,502,215 A | 3/1970 | Cahan | |
| 3,507,798 A | 4/1970 | Egan et al. | |
| 3,658,590 A | 4/1972 | Huebner et al. | |
| 3,658,712 A | 4/1972 | Lindner et al. | |
| 3,776,850 A | 12/1973 | Pearson et al. | |
| D235,872 S | 7/1975 | Harussi | |
| 3,911,938 A | 10/1975 | Wiltrout | |
| 3,915,738 A | 10/1975 | Willard, Sr. | |
| 3,928,065 A | 12/1975 | Savino | |
| 3,940,069 A | 2/1976 | Gunzel, Jr. et al. | |
| 3,954,644 A * | 5/1976 | Krezanoski et al. | 510/112 |
| D252,097 S | 6/1979 | Probst et al. | |
| 4,242,201 A * | 12/1980 | Stephens et al. | 210/240 |
| 4,253,842 A | 3/1981 | Ehrlich | |
| 4,294,729 A | 10/1981 | Bakos et al. | |
| 4,307,840 A | 12/1981 | Schulze et al. | |
| 4,368,146 A | 1/1983 | Aronson et al. | |
| 4,442,003 A | 4/1984 | Holt | |
| 4,475,689 A | 10/1984 | Hauger et al. | |
| 4,591,449 A | 5/1986 | Goedhart et al. | |
| 4,597,886 A | 7/1986 | Goedhart et al. | |
| 4,628,644 A | 12/1986 | Somers | |
| 4,715,391 A | 12/1987 | Scheller | |
| 4,752,034 A | 6/1988 | Kuhn et al. | |
| 4,754,928 A * | 7/1988 | Rogers et al. | 239/381 |
| 4,764,047 A | 8/1988 | Johnston et al. | |
| 4,785,850 A | 11/1988 | Sanchez | |
| 4,901,923 A | 2/1990 | McRoskey et al. | |
| 4,967,960 A | 11/1990 | Futrell | |
| 4,969,603 A | 11/1990 | Norman | |
| 5,057,152 A | 10/1991 | Marcus et al. | |
| 5,098,023 A | 3/1992 | Burke | |
| 5,110,479 A * | 5/1992 | Frommer et al. | 210/662 |
| 5,192,025 A | 3/1993 | Hu et al. | |
| 5,238,595 A | 8/1993 | Crutcher et al. | |
| 5,332,158 A | 7/1994 | Styne et al. | |
| 5,429,867 A | 7/1995 | McCarthy et al. | |
| D364,673 S | 11/1995 | Gustafsson | |
| 5,562,824 A * | 10/1996 | Magnusson | 210/266 |
| 5,595,345 A | 1/1997 | Chura et al. | |
| 5,595,451 A | 1/1997 | Harrison, Jr. | |
| 5,630,548 A | 5/1997 | Chih | |
| 5,647,977 A | 7/1997 | Arnaud | |
| 5,662,273 A | 9/1997 | Chih | |
| 5,681,463 A * | 10/1997 | Shimizu et al. | 210/266 |
| 5,721,306 A | 2/1998 | Tsipursky et al. | |
| 5,758,825 A | 6/1998 | Hsu | |
| 5,759,980 A | 6/1998 | Russo et al. | |
| 5,782,988 A | 7/1998 | Whatley, Sr. | |
| 5,830,360 A * | 11/1998 | Mozayani | 210/651 |
| 5,850,973 A | 12/1998 | Liljeqvist et al. | |
| 5,853,809 A | 12/1998 | Campbell et al. | |
| 5,962,388 A | 10/1999 | Sherry et al. | |
| 5,964,415 A * | 10/1999 | Hadar | 239/317 |
| 6,016,977 A * | 1/2000 | Farley | 239/553.3 |
| D422,055 S | 3/2000 | Stasny et al. | |
| 6,125,860 A | 10/2000 | de Sebastian | |
| 6,158,258 A * | 12/2000 | Bowman | 68/205 R |
| 6,225,434 B1 | 5/2001 | Sadvary et al. | |
| 6,264,119 B1 * | 7/2001 | Truong | 239/310 |
| 6,284,124 B1 | 9/2001 | DiMascio et al. | |
| 6,342,473 B1 | 1/2002 | Kott et al. | |
| 6,369,019 B1 | 4/2002 | Gordon et al. | |
| 6,375,094 B1 | 4/2002 | Schroeder et al. | |
| 6,378,789 B1 | 4/2002 | Seaman, Jr. et al. | |
| 6,484,735 B1 | 11/2002 | Gordon et al. | |
| 6,520,190 B2 | 2/2003 | Thompson et al. | |
| 6,527,196 B1 | 3/2003 | Ehrick et al. | |
| 6,537,957 B1 | 3/2003 | Cardola et al. | |
| 6,562,142 B2 | 5/2003 | Barger et al. | |
| 6,569,261 B1 | 5/2003 | Aubay et al. | |
| 6,716,805 B1 | 4/2004 | Sherry et al. | |
| 2002/0045010 A1 | 4/2002 | Rohrbaugh et al. | |
| 2002/0046969 A1 | 4/2002 | Bartsch et al. | |
| 2002/0102359 A1 | 8/2002 | Rohrbaugh et al. | |
| 2002/0108640 A1 | 8/2002 | Barger et al. | |
| 2002/0144712 A1 | 10/2002 | Barger et al. | |
| 2002/0160224 A1 | 10/2002 | Barger et al. | |
| 2002/0160924 A1 | 10/2002 | Bertrem et al. | |
| 2002/0176982 A1 | 11/2002 | Rohrbaugh et al. | |
| 2002/0179535 A1 | 12/2002 | Luitch | |
| 2002/0185420 A1 | 12/2002 | Horstman et al. | |
| 2003/0017960 A1 | 1/2003 | Bertrem et al. | |

* cited by examiner

SPRAYING DEVICE

This application claims the benefit of the filing date of PCT international patent application US00/16343 filed on Jun. 14, 2000.

TECHNICAL FIELD

The present invention relates to a spraying device comprising a container, a spray head and a water purifier. In an alternative embodiment the invention relates to a container suitable for use in with a spraying device, comprising a water purifier. The purifier is preferably located inside the container and cooperates with the spray head. The purifier is preferably a filter, which is preferably a layered bed of ion exchange resins. In another preferred embodiment the container comprises a hydrophilic-surface modifying cleaning composition. The spraying device preferably also comprises means for connection to a hose and can be used for, for example, cleaning vehicles, exterior surface of windows etc.

BACKGROUND

Products for cleaning hard surfaces are widely available on the market. These products are used for two purposes, the first being to clean soil from the surface and the second being to leave the surface with an aesthetically pleasing finish e.g. spot-free and/or shiny. However products available on the market often require rinsing with water after use. Typically when the water dries from the surface water-marks, smears or spots are left behind. These water-marks, it is believed may be due to the evaporation of water from the surface leaving behind deposits of minerals which were present as dissolved solids in the water, for example calcium or magnesium or sodium ions and salts thereof or may be deposits of water-carried soils, or even remnants from a cleaning product for example soap scum. One solution to this problem as provided in the prior art has been to clean the surface with a cleaning composition which modifies the surface to leave a hydrophobic finish. Thus during the cleaning process the majority of the water drains rapidly from the surface and the remainder forms discrete droplets or beads on the surface because of the hydrophobic interactions. However the Applicant has found that although the surface dries quickly, it is also left with noticeable spots or marks, known as water-marks. This problem is particularly apparent when cleaning ceramic, steel, plastic, glass or painted surfaces. A means of solving this problem, known in the art is to dry the surface using a cloth or chamois before the water-marks form. However this drying process is time consuming and requires considerable physical effort.

WO97/48927 describes a process for cleaning the exterior surface of a window using a spray gun and a means for preparing purified water. The windows are first cleaned with a cleaning composition and then rinsed with purified water. Whilst the use of this spray gun, may initially solve the problem of residual water marks on surfaces on drying, the Applicants have found that the spray gun has an inefficiently short life-span which thus requires the user to replace the ion-exchange resin cartridge after each use. Moreover the cleaning compositions described in WO97/48927 render the surfaces treated therewith, hydrophobic. It thus an object of the present invention, to provide a spraying device and container comprising a new purifier which has improved capacity versus the purifier described in WO97/48927.

In another aspect of the present invention the purifier is located inside the cavity of the container. In another aspect the container is suitable for attachment to a spray head to form the spraying device described in the present invention. The benefit in locating the purifier inside the container is in the ease of assembling the spraying device, allowing the user to quickly and accurately align the input and output ports of the purifier and the means for removing the cleaning compositions from the container, with the valve system in the spray head. A further benefit of locating the purifier inside the cavity of the container is that it can not be accessed by the user. The user is therefore discouraged from using the spraying device without also using the purifier, since this would lead to poor performance results. Moreover, since the purifier can not be regenerated, locating the purifier inside the container also ensures that the user replaces the purifier at the same time as he replaces the cleaning composition. For this reason the container comprising cleaning composition and the purifying device can then be made available as a combined recharge unit.

In another aspect of the present invention there is described a container suitable for use as a component of the spraying device comprises a purified and a composition capable of rendering the surface treated, hydrophilic. The Applicants have found that cleaning compositions which render the surface hydrophilic rather than hydrophobic provide improved cleaning performance, but can also be rinsed from the surface treated more easily.

SUMMARY OF THE INVENTION

According to the present invention there is provided a hand-held spraying device comprising a container (1), a spray head (11) and a water purifier (30), characterised in that the purifier is located inside the cavity of the container.

In a further aspect of the present invention there is provided a hand-held spraying device comprising a container (1), a spray head (11) and a water purifier (30), characterised in that the purifier comprises a layered ion-exchange bed.

In yet a further aspect of the present invention there is provided a spraying device comprising a container (1), a water purifier (30) and a spray head (11), characterised in that the spray head comprises an integrated delivery system designed to facilitate compliance with a three or more step wash and rinse process.

In a further aspect of the present invention there is provided a container (1) comprising a water purifier (30) located inside the cavity of the container, being adapted for use with the spraying device according to any of the preceding claims.

In yet another aspect of the present invention there is provided a container (1) comprising a water purifier (30) and a cleaning composition designed to render a surface treated therewith hydrophilic and comprising a hydrophilic surface modifying component.

In a further aspect of the present invention there is also provided a container (1) comprising a water purifier (30) wherein the purifier comprises a layered bed of an ion-exchange resin.

DETAILED DESCRIPTION OF THE INVENTION

Figure 1:
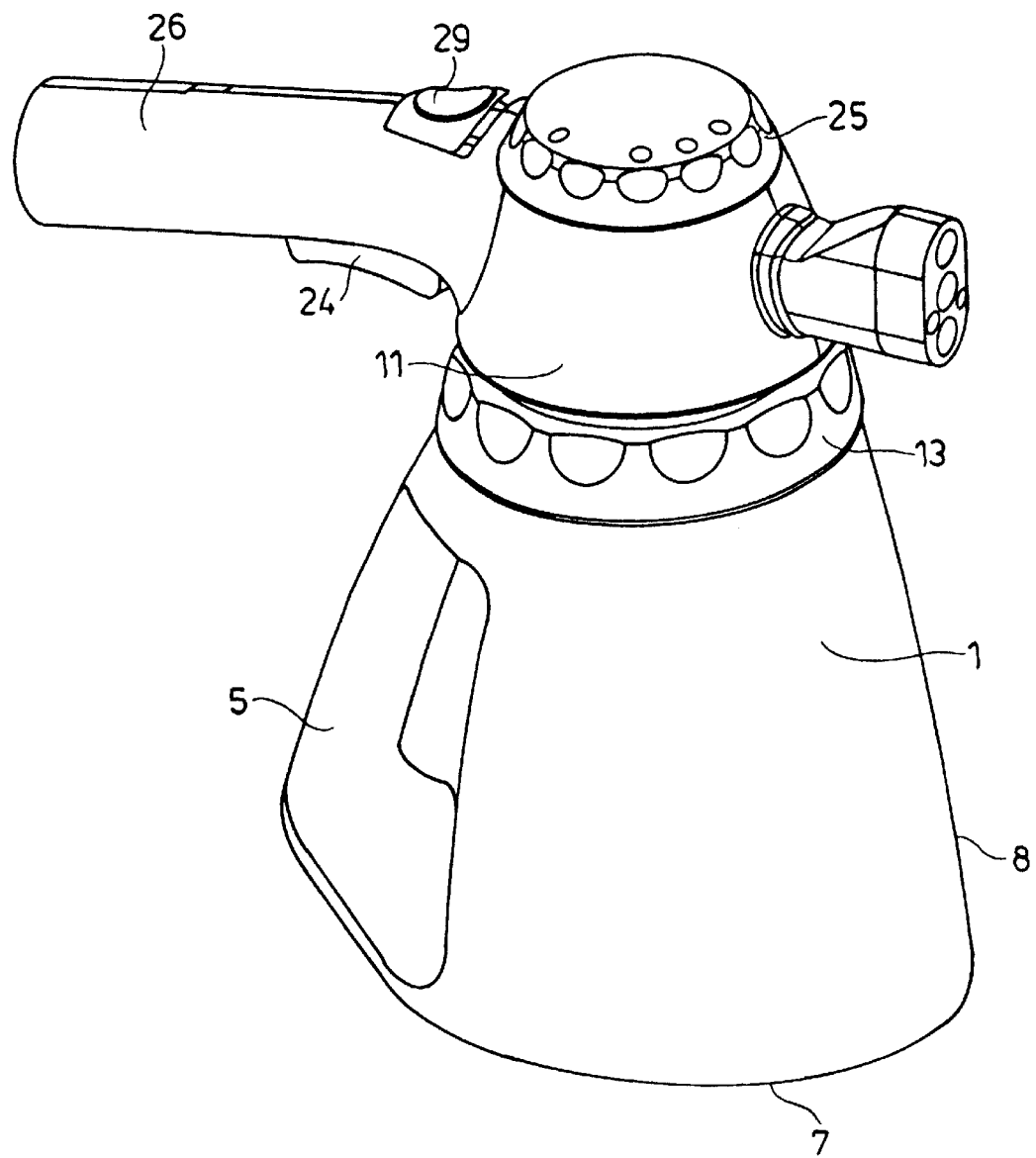
FIG. 1 is perspective view of the spraying device
Figure 2:
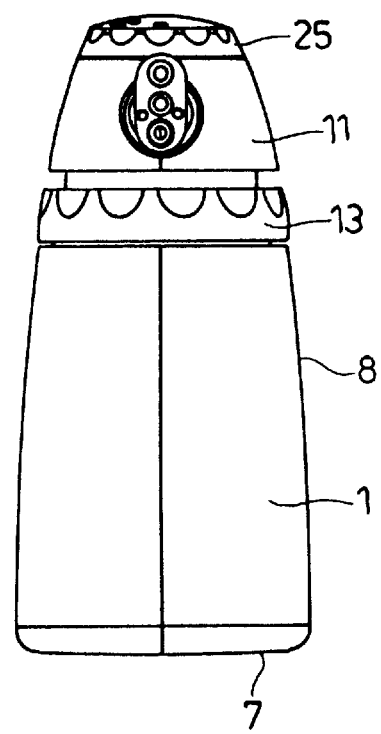
FIG. 2 is a front view of the spraying device
Figure 3:
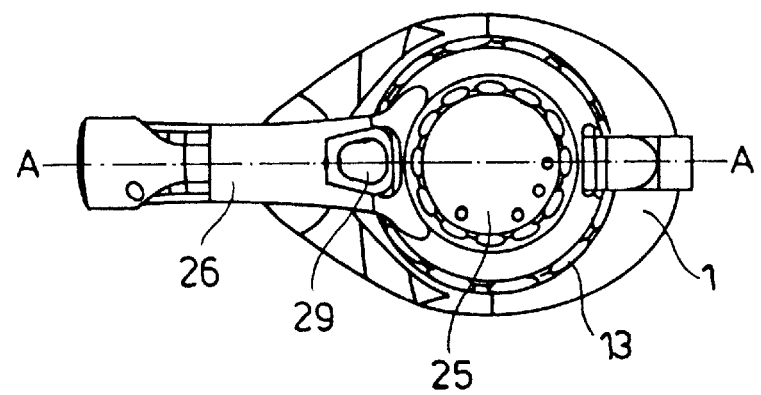
FIG. 3 is a plan view of the spraying device
Figure 4:
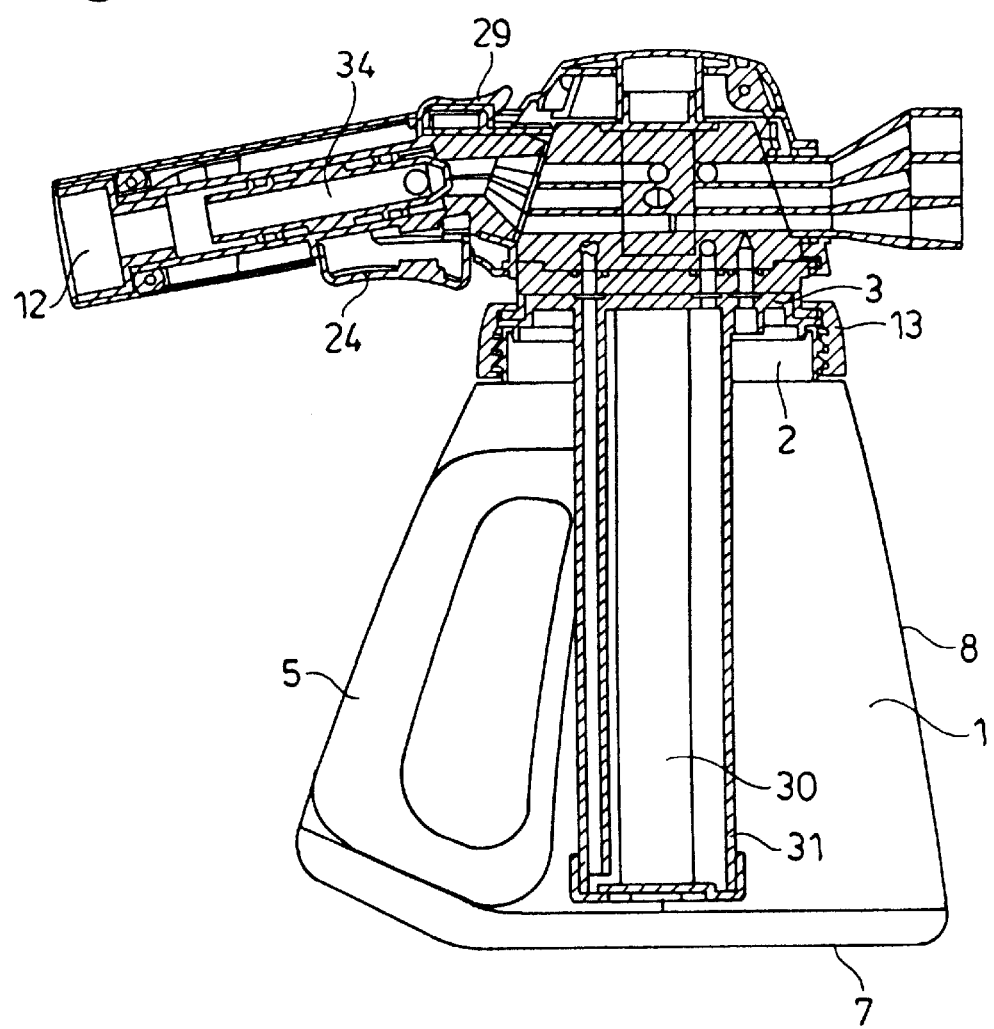
FIG. 4 is a cross-sectional view of the spraying device through A—A of FIG. 3
Figure 5:
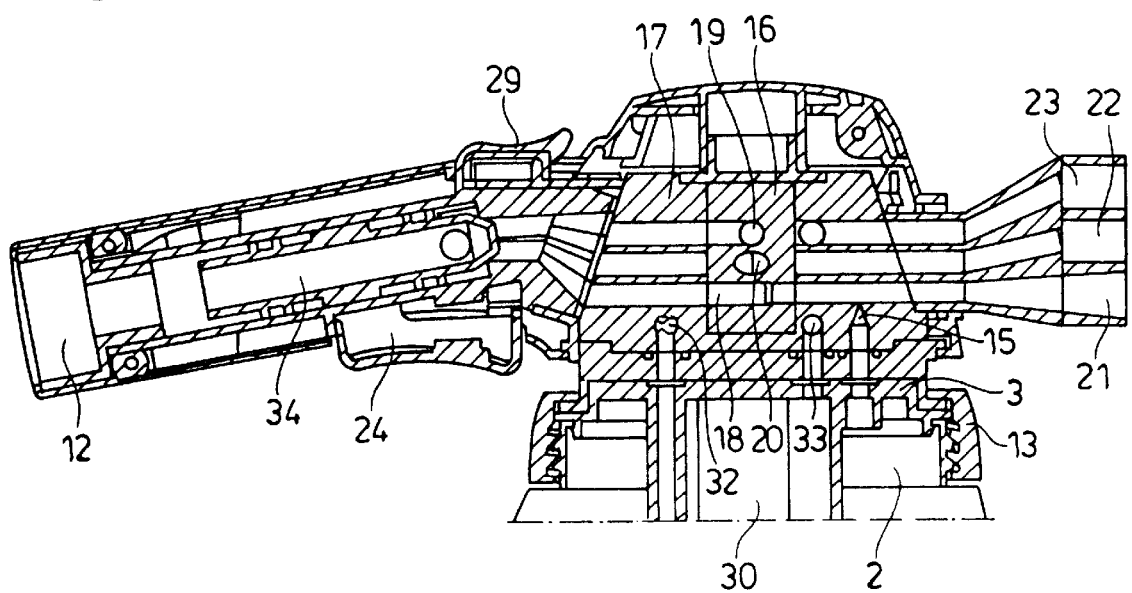
FIG. 5 is a cross-sectional view of the spray head through A—A of FIG. 3
Figure 6:
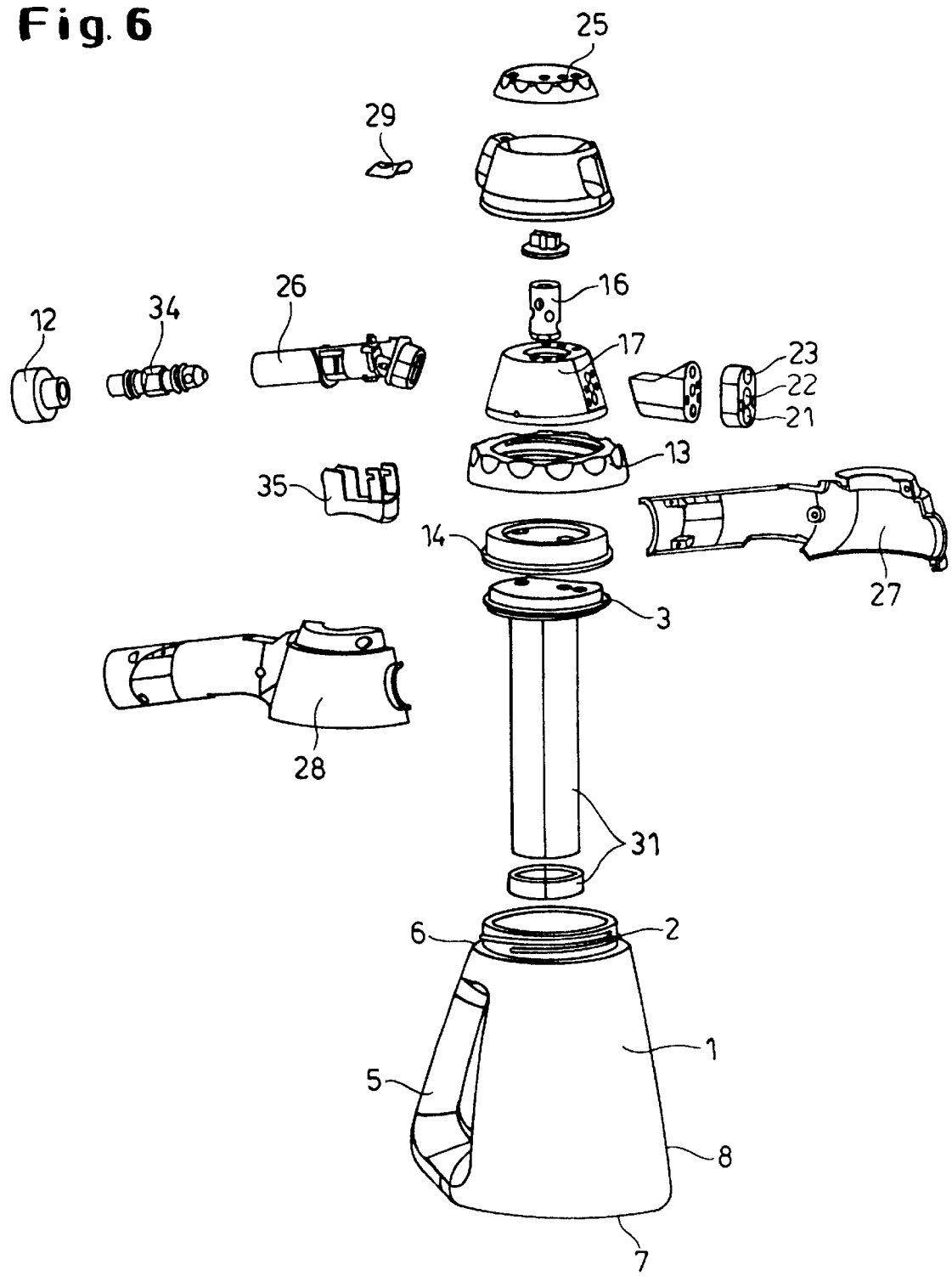
FIG. 6 is an exploded view of the spraying device

The spray device of the present invention can be used to clean hard surfaces for example ceramic, porcelain, enamel, vinyl, no-wax vinyl, linoleum, melamine, glass, any plastics, plastified wood, metal, especially steel and chrome metal, varnished or sealed surfaces, floors, walls, tiles, windows and especially, the exterior surfaces of a vehicle, e.g. painted, plastic or glass surfaces and finishing coats.

In a preferred embodiment the spraying device is a hose-end venturi system and thus the spraying device may preferably comprise a means of attachment to a conventional garden hose. Optionally an extension attachment can be used to reach areas otherwise not easily accessible such as higher altitude windows or car rooftops. Preferably the spray device also comprises a valve system which is designed to ensure that the user complies with a washing and rinsing process involving a washing step, an unpurified water rinsing step and a purified water rinsing step. More preferably the process comprises an unpurified water rinsing step before the washing step in order to pre-wet the surface. The valve system also preferably incorporates a selector system, for example a rotatable dial, allowing the user to choose between the wash, unpurified rinse and purified rinse settings. In the wash setting the valve system is aligned such that water from the hose enters the device via the water inlet, and mixes with the cleaning composition in a mixing chamber which is then sprayed onto the surface to be cleaned. More preferably, the device is a venturi type system whereby a vacuum created by water passing over the top of a means for removing the cleaning composition from the container, e.g. a dip-tube extending into the cleaning composition stored in the container, withdraws cleaning composition from the container. The cleaning composition and water is then sprayed onto the surface to be cleaned. Once the selector is moved into the rinse setting, the valve redirects the influx water away from the cleaning composition or purifier and water is sprayed onto the surface to rinse the cleaning composition and dirt from the surface cleaned. The selector system can then be placed in the purified rinse setting, whereby the water is passed through a purifier system before being sprayed onto the surface. The purifier removes ions and other impurities from the rinse water and hence leaves the surface onto which the purified water has been sprayed, without water marks or residues upon drying.

Container

The container, 1, of the present invention comprises at least one compartment, however it is also envisaged that the present container may comprise more than one compartment, preferably two, three or even four compartments. Said container can be either substantially rigid, flexible or collapsible. Said container can be made from plastic, glass, metal or metal alloy or a combination thereof. More preferably the container, including all elements of the container, are made from plastic, more preferably thermoplastic material. Examples of preferred thermoplastic materials include polypropylene (PP), polyethylene (PE), high density polyethylene (HDPE), polyethylene terephthalate (PET) or a combination thereof.

The container, 1, is preferably substantially rigid, and comprises top 6, bottom 7 and peripheral side 8 walls defining an internal cavity. The bottom wall, 8, of the container preferably comprises a "push-up" where the surface of the container in contact with the cleaning composition is raised, for example is inclined or bowed to aid the stability of the container.

The container, 1, is preferably provided with at least one venting hole. The venting holes provide at least two functions, namely it allows the escape of any gas developed by the cleaning composition during storage and allows the equalization of the pressure in the container once the cleaning composition has been removed. The vent hole, where present, may be located in any suitable place on the container walls, however the vent hole is preferably present on the top wall of the container or more preferably in the plate (described in detail later).

In a preferred aspect the vent hole is covered, but even more preferably comprises a one-way valve. In each case the cover or valve prevents the flow of the composition through the vent hole, but does not impede the escape of gas. In a preferred embodiment, the container is equipped with a neck portion, 2, which defines an opening and provides a location of attachment of the spray head. The neck portion, 2, can be located at any position on any wall of the container, but is preferably located in a position on the top wall. The neck can have any suitable shape, but is preferably substantially cylindrical. In one embodiment, the neck portion comprises at least one screw thread which may cooperate with a screw thread of the spray head or a threaded collar, 13. In another embodiment, the spray head may be attached to the neck by means of a groove or protrusion on the neck to which at least one corresponding protrusion or groove of the spray head is clipped in a releasable or non-releasable manner. Where present the neck portion can be made from any of the materials as listed above, however the neck portion is preferably rigid. In a preferred embodiment the container comprises a closure such as a cap which cooperates with the neck portion of the container. Alternatively the closure may comprise a plate which is inserted into the neck portion of the container.

The container optionally comprises at least one gripping means, 5. The gripping means, 5, may be for example a handle. The handle may be integral to or and an extension of the multiple-compartments. Alternatively the gripping means, 5, may comprise an area of the surface of the container which is modified to facilitate grip by the user. An example of this second embodiment, may be for example the texturing of the container surface to increase friction.

The process used for making a container, 1, as described above depends on the size, shape and materials of the container being made. In the case where the container is rigid, suitable manufacturing processes may be appropriately chosen by a skilled person. Such processes may include, but are not limited to: blow molding, injection molding, injection-blow-molding, or extrusion-blow-molding. In the case where the container is flexible and/or malleable, suitable manufacturing processes can again be selected by the skilled person. However such processes include, but are not limited to: blow molding; extrusion-blow-molding; and injection-molding. In the latter case, a bag, sachet or pouch may also be produced by a forming and sealing process, with the rigid neck being sealed or integrated on one side of the bag, sachet or pouch.

Spray Head

The spray head, 11, preferably comprises a number of parts, for example a means for connection to a hose 12, attachment means for attachment of the spray head to the container 13, means for removal of the cleaning composition from the container 15, a valve system suitable for controlling water flow through the spray device and means for operating said valve system 25, at least one spray nozzle 21 and an operating switch or trigger 24.

In a particularly preferred embodiment the spray head 11, is a hand-held hose end spraying head and thus also comprises a means of attaching the spray head to a hose, 12. Such attachment means may comprise any known attachment available in the prior art. Preferred attachment means 12, include a threaded hose coupling or a quick disconnect snap fitting.

The spray head 11, may be attached to the container using any suitable means for example snap fit, screw, bayonet, threaded collar fittings. The spray head is preferably fitted with a threaded collar 13, comprising a screw thread which then cooperates with a screw thread on the container neck. Alternatively, the spray head may be attached to the container, using an interlocking or "lock & key" system which facilitates alignment of the container and the valve system in the spray head. In a preferred embodiment of the present invention, the spray head is attached to the container using both the "Lock & Key" system and the screw collar. In another alternative embodiment, a plate, 3, may be inserted into the neck of the container or alternatively between the container and spray head. The plate, 3, may be useful as a closure to cover the container, retaining the cleaning composition within the container until required and preventing it from damaging the mechanisms of the spray head. Where the plate, 3, is present it may be preferable for the plate to provide the cooperating surface of the "lock and key" system, where present, which then cooperates with that of the spray head, 14. Furthermore in this embodiment it is then also preferable to use the collar attachment system 13, described above, to attach the spray head to the container.

The spray head 11, comprises means for removal of the cleaning composition from the container 15. The spray head 11, preferably comprises or has attached thereto a dip-tube 15, which extends into the cleaning composition. In this embodiment the passage of influx water from the hose passing over the top of the dip-tube, creating a vacuum which withdraws the cleaning composition from the container and into the spray head. In a particularly preferred embodiment the plate 3, may be used to suspend the dip-tube 15, within the cavity of the container. Alternatively the influx water may be allowed to flow into the container, mix with the cleaning composition and then flow out of the container via the same or another opening in the container. Alternatively the container may be pressurised so as to force the cleaning composition from the container. In this latter embodiment the container preferably does not comprise any vent holes.

The valve system comprises any system which allows the user to select different settings on the device. Preferably the valve system is capable of facilitating the users compliance with a defined wash and rinse process comprising at least a washing step, an unpurified water rinsing step and a purified water rinsing step.

The valve system preferably comprises three channel which direct the inlet water to the means for removal of cleaning composition, the purified or directly to the spray nozzle. Preferably the valve system comprises a first channel, 18, which directs inlet water to the means for removal of the cleaning composition, a second channel 19, which directs inlet water directly to a second spray nozzle and a third channel, 20, which directs inlet water to the purifier. In one preferred embodiment the valve system comprises a rotatable valve core, 16, seated in a valve housing, 17, comprising a first 18, a second 19 and a third channel 20. The valve core 16, can be selectively rotated such that the first channel 18, aligns with the inlet water and the means for removal if the cleaning composition from the container 15, for example the dip-tube 15. The pressure of the water passing over the opening of the dip-tube creates a vacuum. The vacuum causes the withdrawal of cleaning composition from the container into the spray head, where it mixes with the inlet water. The mixture of cleaning composition and water is then sprayed from a spray nozzle 21. The valve core 16, may then be rotated such that the second channel 19, is aligned with the inlet water and is directed straight to a spray nozzle 22, during the unpurified rinse water setting. Finally, the valve core 16, may be rotated such that the third channel 20, is aligned with the inlet water and the purifier 30. During this purified rinse water setting, water passes through the purifier 30, to produce purified rinse water which is then sprayed through a spray nozzle 23.

In an alternative embodiment the entire valve system, core 16, plus housing 17, may be rotated which provides a channel between the influx water and the dip-tube during the wash setting, the purifier during the purified rinse setting and neither during the unpurified rinse setting. The spray head preferably comprises a means for operating the valve system, such as a selector dial or switch 25.

The spray nozzle defines the orifice from which the unpurified water, purified water and/or cleaning composition is sprayed. In an alternative embodiment, the spray head may be equipped with two or more, spray nozzles one for each or a combination of each of water, purified water or cleaning composition. Most preferably the spray head 11 comprises three spray nozzles one for spraying the cleaning composition 21, the unpurified water 22, and the purified water 23. The spray nozzle may additionally be fitted with an attachment to allow the user to change the spray pattern of fluid sprayed from the device. Thus the user may choose a fine mist spray, a directed forceful spray or any pattern in between. Any such attachment known in the prior art and suitable for achieving this function may be used herein. Importantly, the spray nozzle may and preferably does provide a second benefit which is the control of the flow rate of fluid through the device. The consequence of such control is that the amount of cleaning composition sprayed can be controlled to as to ensure that the correct amount of composition is used per wash. Even more preferably, controlling flow rate also means that the residence time of influx water in the purified can also be controlled, so as to permit optimised filtration at preferably less than 2 gallons per minute.

The spray head 11, also preferably comprises an operating switch 24, such that when the switch is in the 'on' position a valve, is opened to allow the influx of water through the device and when the switch 24, is in the 'off' position the valve reverts back to it's original position, inhibiting the flow of influx water. The valve may be electrically opened, but is preferably mechanically opened. Hence in a particularly preferred embodiment the switch comprises a trigger 35, a spring and a plunger, 34. The user applies pressure to the trigger 35, which then causes the spring to compress, pushing the plunger 34, and opening the valve. Once pressure has been removed from the trigger 35, the spring allows the plunger 34, to resume the original position, closing the valve. In a preferred embodiment the switch also comprises a locking system 29, such that the switch and valve can be maintained in the open position until the lock is removed.

In a preferred embodiment the spraying device, more preferably the spray head 11, comprises a visual indicator that signals to the user that the device is at different stages of the wash and rinse process. For example the indicator may signal when the cleaning composition is being sprayed from the device, but more preferably signals when the purified rinse water is being sprayed. The visual indicator comprise a light source which illuminates when the predetermined step or steps are in operation. In a preferred embodiment the visual indicator is a difference in spray pattern of fluid from the device between the unpurified rinse water spray and the purified rinse water spray. This is achieved using different spray nozzles for each of the unpurified and purified rinse water settings.

The valve system and spray nozzles discussed above are housed in a water tight body. The body may be made using any suitable material, but is preferably made from plastic, more preferably thermoplastic material and is preferably rigid. Examples of preferred thermoplastic materials include polypropylene (PP), polyethylene (PE), high density polyethylene (HDPE), polyethylene terephthalate (PET) or a combination thereof. In a preferred embodiment the body comprises a left 27, and right 28, segment which fit over the left and right sides of the valve system, allowing an opening for the spray nozzle(s). The body segments are then attached to one another using any suitable means, preferable the segments are screwed together. The spray head 11, also preferably comprises a handle 26, to facilitate grip by the user. Where said handle 26, is present it preferably forms part of the body and incorporates the operating switch 24, and lock 29.

Water Purifier

The spraying device of the present invention also comprises a water purifier, 30, which is in one embodiment located in the container cavity. The water purifier 30, is preferably a filter and comprises any known filtering material. In a preferred embodiment the purifying material is an ion exchange resin. Even more preferably the purifying material is a mixture of several ion exchange resins or most preferably layers of different ion exchange resins. The ion exchange resin is selected from the group of strong acid cation (SAC), strong base anion (SBA), weak acid cation (WAC) and weak base anion (WBA) ion exchange resins. Strong acid or strong base ion exchange resins are those which comprise a strong acid or base functionality. A strong acid or strong base functionality are those which have a pKa or pKb, respectively, of higher than 2.5. A weak acid or base functionality is defined by a pKa or pKb, respectively, of less than 2.5. The purifying device may preferably comprise a random mixture of strong acidic and strong basic ion exchange resins. However in one especially preferred embodiment the purifying device comprises a sequential bed design of three different ion exchange resins, namely weak acidic, strong acid and weak basic and even more preferably in that order.

By SAC ion exchange resin it is meant a resin that filters all cations including calcium, magnesium and sodium. Examples of SAC ion exchange resins include, but are not limited to Rohm and Haas IRN77, 1500H and Purlite C100H.

By SBA ion exchange resin it is meant a resin that filters all anions including sulfate, chloride, carbonate, bicarbonate and silicate. Examples of SBA ion exchange resins include, but are not limited to Rohm and Haas 44000H and Purlite A4000H.

By WAC ion exchange resin it is meant a resin that selectively filters the hardness ion and other multi-valent and mono-valent cations associated with alkalinity. Examples of WAC ion exchange resins include, but are not limited to Rohm and Haas IRC86 and Purlite C104.

By WBA ion exchange resin it is meant a resin that selectively filters strong acid anions such as sulfate and chloride. Examples of WBA ion exchange resins include, but are not limited to Rohm and Haas IRA67 and Purlite A830.

In a preferred embodiment, small particle size resin beads are used for higher ion exchange efficiency. By small particle size resin beads it is preferably meant beads of less than 1.0 mm in diameter, more preferably less than 0.6 mm and most preferably less than 0.4 mm in diameter. It is believed that small particle size resin beads provide improved efficiency due to the faster ion exchange kinetics of the smaller particle size resins. The faster kinetics results in greater utilization of the ion exchange capacity. In a further preferred embodiment the filter has a volume capacity of no greater than 100 in$^3$ and is suitable for use in a hand-held device. In a further preferred embodiment the filter has a volume capacity of at least 4 in$^3$, more preferably at least 6 most preferably at least 8 in$^3$.

In a particularly preferred embodiment the purifying device comprises a visual indicator of depletion of purifying capacity. In a preferred embodiment at least one type of resin in the purifying device which provides the visual indicator. In a particularly preferred embodiment the visual indicator is provided by a change in colour of a resin. Indicators generally used for acid/base titration can also be used to indicate the depletion of resin exchange capacity. Since many indicators themselves are ionic in nature, ion resins can be prepared in indicator form by treating them with 0.1% solution of the indicator in 95% ethanol. Typical indicators used include phenolphthalein, thymol blue and bromocresol green. The mechanism of the indicator color change on the resin is basically the same as the mechanism in a solution during an acid/base titration. The water trapped in the SAC matrix, for example, is very acidic by nature because of the hydrogen ions. As the hydrogen ions gets exchanged out, the pH slowly rises. Eventually this pH change triggers the color change. Thymol blue, for example, has a transition range between pH 1.2–2.8. Commercially available resins that change color upon exhaustion include Purolite MB400IND (blue regenerated, amber exhausted) and MB400QR (colorless regenerated, red exhausted). Many resin manufacturers will also dye the resins upon request for specific applications.

In one embodiment of the present invention the purifier 30, is located inside the cavity of the container. The purifier may be located at any point on the inside of the container. In one embodiment the purified may be in close proximity to, or even attached to the side wall 8, of the container. Alternatively the purifier 30, may be molded into the side wall 8, of the container. In another embodiment the purifier 30, may be located in the neck portion 2, of the container 1, sandwiched between the neck portion 2, of the container and the spray head 11. In a preferred embodiment of the present invention the purifier 30, is suspended inside the container from a plate 3, which is secured into the neck portion orifice of the container 1, from which may also be suspended the dip tube 15. In this embodiment the plate 3 provides the cooperating surface for achieving the lock and key system described above. The purifying material usually comprises small particles of ion exchange resin and thus must be supported either adhered onto a supporting structure or inside a canister, 31. In this embodiment, it is the structure or canister which is then suspended from the plate.

The purifier can be of any size or shape suitable for the present purpose. In a preferred embodiment the purifier has size and shape such that it can be located inside the container. In a particularly preferred embodiment where the purifier is suspended inside the cavity of the container, it has a substantially cylindrical shape. In a further preferred embodiment the purifier occupies no more than 50% of the volume of the container.

Influx water is passed through one end of the purifier, 32, and then collected at the opposing end, 33, where the, thus purified water is then transmitted to the spray head and used in the purified rinse step. In a preferred embodiment influx water is first transmitted to the distal end of the purifier from the plate, travels in an upward direction through the purifying material where it then feeds though a hole in the plate at the proximal end, into the valve system where it is then transmitted to the spray nozzle.

Cleaning Composition

The containers as described above are designed to store a cleaning composition. In one embodiment of the present invention, the container comprises a purifier and a cleaning composition which is capable of rendering the surface treated therewith hydrophilic. In order to achieve a hydrophilic surface the composition comprises a hydrophilic surface modifying component.

The hydrophilic surface modifying component is preferably a polymer which deposits on the surface being cleaned during the cleaning process. The polymer is preferably selected from the group consisting of homo or copolymer and preferably comprises at least one hydrophobic or cationic moiety and at least one hydrophilic moiety. The hydrophobic moiety is preferably aromatic, C8–18 linear or branched carbon chain, vinyl imidazole or a propoxy group. Cationic moieties include any group that is positively charged or has a positive dipole. The hydrophilic moiety may be selected from any moiety that forms a dipole which is capable of hydrogen bonding. Suitable examples of such hydrophilic moieties include vinyl pyrrolidone, carboxylic acid, such as acrylic acid, methacrylic acid, maleic acid, and ethoxy groups.

In a preferred aspect, the polymer is selected from the group consisting of copolymers of polyvinyl pyrrolidone. A particularly preferred copolymer of polyvinyl pyrrolidone is N-vinylimidazole N-vinylpyrrolidone (PVPVI) polymers available from for example BASF under the trade name Luvitec VP155K18P. Preferred PVPVI polymers have an average molecular weight of from 1,000 to 5,000,000, more preferably from 5,000 to 2,000,000, even more preferably from 5,000 to 500,000 and most preferably from 5,000 to 15,000. Preferred PVPVI polymers comprise at least 55%, preferably at least 60% N-vinylimidazole monomers. Alternatively another suitable polymer may be a quaternized PVPVI for example the compound sold under the tradename Luvitec Quat 73W by BASF.

Other suitable copolymers of vinylpyrrolidone for use in the compositions of the present invention are quaternized vinylpyrrolidone/dialkylaminoalkyl acrylate or methacrylate copolymers. The quaternized vinylpyrrolidone/dialkylaminoalkyl acrylate or methacrylate copolymers suitable for use in the compositions of the present invention are according to the following formula:

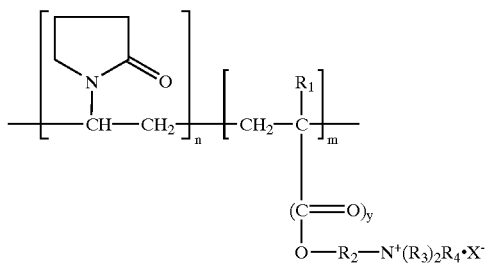

in which n is between 20 and 99 and preferably between 40 and 90 mol % and m is between 1 and 80 and preferably between 5 and 40 mol %; $R_1$ represents H or $CH_3$; y denotes 0 or 1; $R_2$ is —$CH_2$—CHOH—$CH_2$— or $C_xH_{2x}$, in which x=2 to 18; $R_3$ represents a lower alkyl group of from 1 to 4 carbon atoms, preferably methyl or ethyl, or

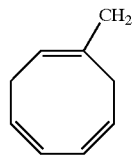

$R_4$ denotes a lower alkyl group of from 1 to 4 carbon atoms, preferably methyl or ethyl; $X^-$ is chosen from the group consisting of Cl, Br, I, $\frac{1}{2}SO_4$, $HSO_4$ and $CH_3SO_3$. The polymers can be prepared by the process described in French Pat. Nos. 2,077,143 and 2,393,573.

The preferred quaternized vinylpyrrolidone/dialkylaminoalkyl acrylate or methacrylate copolymers for use herein have a molecular weight of between 1,000 and 1,000,000, preferably between 10,000 and 500,000 and more preferably between 10,000 and 100,000.

Such vinylpyrrolidone/dialkylaminoalkyl acrylate or methacrylate copolymers are commercially available under the name copolymer 845®, Gafquat 734®, or Gafquat 755® from ISP Corporation, New York, N.Y. and Montreal, Canada or from BASF under the tradename Luviquat®.

Most preferred herein are quaternized copolymers of vinyl pyrrolidone and dimethyl aminoethymethacrylate (polyquaternium-11) available from BASF.

Another preferred polymer is polyvinyl pyridine N-oxide (PVNO) polymer available from, for example Reilly. Preferred PVNO polymers have an average molecular weight of 1000 to 2000000, more preferably from 5000 to 500000, most preferably from 15000 to 50000.

The average molecular weight range was determined by light scattering as described in Barth H. G. and Mays J. W. Chemical Analysis Vol 113, "Modern Methods of Polymer Characterization".

The cleaning composition preferably comprises other conventional components of a cleaning composition, including for example, anti-resoiling ingredients, surfactants, clay, chelating agents, enzymes, hydrotopes, ions, suds control agents, solvents, buffers, thickening agents, radical scavengers, soil suspending polymers, pigments, dyes, preservatives, disinfectants, brighteners, UV protectants, rust inhibitors and/or perfumes. Surfactants are particularly preferred components.

What is claimed is:

1. A hand-held spraying device comprising one or more containers, a water purifier, and a spray head, all of which are part of said device during use of said device, wherein the one or more containers contains a cleaning composition that is distinct from a supply of water, but which may be mixed with a supply of water, and the spray head comprises an integrated valve system designed to facilitate compliance with a three or more separate step wash and rinse process, wherein one of said steps comprises a step of spraying the cleaning composition in the one or more containers which has been mixed with said supply of water, wherein the spray head comprises a means for connection to a hose which defines a water inlet, attachment means for attachment of the spray head to the one or more containers, said attachment means comprising an interlocking surface which is designed to cooperate with a corresponding interlocking surface of the one or more containers, a means for removal of a composition from one or more containers, and said valve system is suitable for controlling water flow through the spray device and at least one spray nozzle wherein the interlocking corresponding surfaces of the spray head and the one or more containers are so designed as to align an opening of the one or more containers and the opening of the purifier with corresponding holes in the spray head.

2. A hand-held spraying device comprising one or more containers, a water purifier, and a spray head, all of which are part of said device during use of said device, wherein the one or more containers contains a cleaning composition that is distinct from a supply of water, but which may be mixed with a supply of water, and the spray head comprises an integrated valve system designed to facilitate compliance with a three or more separate step wash and rinse process, wherein one of said steps comprises a step of spaying the cleaning composition in the one or more containers which has been mixed with said supply of water, another step comprises an unpurified water rinsing step, and one step comprises a purified water rinsing step, wherein the spray head comprises a means for connection to a hose which defines a water inlet, means for removal of a composition from one or more containers, and said valve system is suitable for controlling water flew through the spray device and at least one spray nozzle wherein the means for removal of a composition from the one or more containers comprises a tube which is attached to the spray head and extends into the cavity of the the one or more containers.

3. A hand-held spraying device comprising one or more containers, a water purifier, and a spray head, all of which are part of said device during use of said device, wherein at least one of the one or more containers contains a cleaning composition that is distinct from a supply of water, but which may be mixed with a supply of water, and the spray head comprises an integrated valve system designed to facilitate compliance with a three or more separate step wash and rinse process, wherein one of said steps comprises a step of spraying the cleaning composition in the at least one container which has been mixed with said supply of water, wherein the spray head comprises a means for connection to a hose which defines a water inlet, attachment means for attachment of the spray head to the one or more containers, a means for removal of a composition from one or more containers, and said valve system is suitable for controlling water flow through the spray device and at least one spray nozzle, wherein the valve system comprises at least three channels comprising:

(a) a first channel aligning the water inlet and the means for removal of a composition from the at least one container;

(b) a second channel aligning the water inlet and the spray nozzle; and (c) a third channel aligning the water inlet and the purifier.

4. A process of cleaning a surface using the spraying device according to claim 3 comprising the steps:

(a) rotating the valve to align the first channel, permitting inlet water to pass through the valve, across the opening of the means for removal of the composition to a first spray nozzle; then (b) rotating the valve to align the second channel, permitting inlet water to pass through the valve to a second spray nozzle; then (c) rotating the valve to align the third channel, permitting inlet water to pass through the valve, then through the purifier to the third spray nozzle.

5. A process according to claim 4 wherein step (b) is performed both before and after step (a).

6. A process according to claim 4 wherein the spraying device presents a visual indication when step (c) is effected.

7. A process according to claim 6 wherein the visual indication is a difference in spray pattern between step (b) and step (c).

8. A hand-held spraying device comprising a container, a water purifier, and a spray head, all of which are part of said device during use of said device, wherein the container contains a cleaning composition that is distinct from a supply of water, but which may be mixed with a supply of water, said composition comprising a component capable of rendering the surface treated therewith hydrophilic, and the spray head comprises an integrated valve system designed to facilitate compliance with a three or more separate step wash and rinse process, wherein one of said steps comprises a step of spraying the cleaning composition in the container which has been mixed with said supply of water, another step comprises an unpurified water rinsing step, and one step comprises a purified water rinsing step, wherein the component capable of rendering the surface treated therewith hydrophilic is selected from the group consisting of a homo- or co-polymer.

9. A spraying device according to claim 8 wherein the hydrophilic surface modifying component comprises at least one hydrophobic or cationic moiety and at least one hydrophilic moiety.

* * * * *